United States Patent [19]
Fraidlin et al.

[11] Patent Number: 5,719,754
[45] Date of Patent: Feb. 17, 1998

[54] INTEGRATED POWER CONVERTER AND METHOD OF OPERATION THEREOF

[75] Inventors: Simon Fraidlin, Plano, Tex.; Valery I. Meleshin, Moscow, Russian Federation; Rais K. Miftakhutdinov, Moscow, Russian Federation; Alexey V. Nemchinov, Moscow, Russian Federation; Sergey M. Korotkov, Moscow, Russian Federation

[73] Assignee: Lucent Technologies Inc., Murray Hill, N.J.

[21] Appl. No.: 662,579

[22] Filed: Jun. 13, 1996

[51] Int. Cl.$^6$ .................................................. H02M 3/335
[52] U.S. Cl. .................................................. 363/17; 363/98
[58] Field of Search .................................. 363/16, 17, 78, 363/95, 97, 98, 131, 132

[56] References Cited

U.S. PATENT DOCUMENTS

| | | | |
|---|---|---|---|
| 4,533,986 | 8/1985 | Jones | 363/17 |
| 4,768,141 | 8/1988 | Hubertus et al. | 363/16 |
| 4,952,849 | 8/1990 | Fellows et al. | 315/307 |
| 4,974,141 | 11/1990 | Severinsky et al. | 363/81 |
| 5,159,541 | 10/1992 | Jain | 363/26 |
| 5,245,520 | 9/1993 | Imbertson | 363/17 |
| 5,268,830 | 12/1993 | Loftus, Jr. | 363/17 |
| 5,274,543 | 12/1993 | Loftus, Jr. | 363/127 |
| 5,305,191 | 4/1994 | Loftus, Jr. | 363/17 |
| 5,321,235 | 6/1994 | Makino et al. | 219/10.55 B |
| 5,382,882 | 1/1995 | Nerone | 315/307 |
| 5,408,403 | 4/1995 | Nerone et al. | 363/37 |
| 5,510,974 | 4/1996 | Gu et al. | 363/134 |
| 5,598,326 | 1/1997 | Liu et al. | 363/34 |

OTHER PUBLICATIONS

"Integrated High Quality Rectifier–Regulators" by Michael Madigan, Robert Erickson and Esam Ismail; Department of Electrical and Computer Engineering; University of Colorado, 1992 pp. 1043–1051.

"Design of a Simple High–Power–Factor Rectifier Based on the Flyback Converter" by Robert Erickson and Michael Madigan; Department of Electrical and Computer Engineering; University of Colorado; 1990 pp. 792–801.

"Reduction of Voltage Stress in Integrated High–Quality Rectifier–Regulators by Variable–Frequency Control" by Milan M. Jovonovic of Delta Power Electronics Lab., Inc. of Blacksburg, VA and Dan M.C. Tsang and Fred C. Lee of Virginia Power Electronics Center Department of Electrical Engineering, Blacksburg, VA; 1994, pp. 569–575.

"A New Family of Single–Stage Isolated Power–Factor Correctors with Fast Regulation of the Output Voltage" by Richard Redl of ELFI S.A., Switzerland and Laszlo Balogh of Ascom Energy Systems, Switzerland and Nathan O. Sokai of Design Automation, Inc., U.S.A.; 1994, pp. 1137–1144.

"A Novel Single–Phase Power Factor Correction Scheme" by Yimin Jiang, Fred C. Lee, Guichao Hua Wei Tang, Virginia Power Electronics Center, The Bradley Department of Electrical Engineering, Virginia Polytechnic Institute and State University, Blacksburg, VA; 1993, pp. 287–292.

"Design Considerations for Single–Stage Isolated Power–Factor–Corrected Power Supplies with Fast Regulation of the Output Voltage" by Richard Redl of ELFI S.A., Switzerland and Laszlo Balogh of Unitrode Integrated Circuits, Merrimack, N.H. U.S.A.; 1995 pp. 454–458.

(List continued on next page.)

*Primary Examiner*—Adolf Berhane

[57] ABSTRACT

An integrated power converter and a method of operation thereof. The integrated power converter, having an energy storage device, includes: (1) a conditioning circuit coupled to the energy storage device and having a control switch for affecting a voltage across the energy storage device, (2) an asymmetrical half-bridge power circuit coupled to the energy storage device and having first and second power switches capable of being alternately activated to conduct current from the energy storage device to an output thereof and (3) a controller for controlling activation of both the control switch and the first and second power switches as a function of a characteristic of the output thereby to enhance a regulation of the output.

21 Claims, 7 Drawing Sheets

OTHER PUBLICATIONS

"Automatic Current Shaper with Fast Output Regulation and Soft–Switching;" BRKOVIC Milivoje, CUK Slobodan, California Institute Technology, Pasadena, USA 1993 pp. 1–8.

"Novel Single Stage AC–to–DC Converters with Magnetic Amplifiers and High Power Factor" by Milivoje Brkovic, TESLACO, Irvine, CA and Slobodan Cuk, Power Electronics Group, Pasenda, CA; 1995, pp. 447–453.

"RMS, DC, Peak, and Harmonic Currents in High–Frequency Power–Factor Correctors with Capacitive Energy Storage" by Richard Redl of ELFI S.A., Switzerland and Laszlo Blogh of Ascom Hasler, Energy Systems, Switzerland, 1992 pp. 533–540.

"Current Waveform Distortion in Power Factor Correction Circuits Employing Discontinuous–Mode Boost Converters" by Kwang–Hwa Liu and Yung–Lin Lin of ITT Power Systems Corp., Tucson, Arizona, 1989 pp. 825–829.

"Sub–Kilowatt Telecom Rectifiers: Design Trade–Offs" by A.S. Kislovski of Ascom Energy Systems, Switzerland 1994, pp. 241–248.

Publication enntitled "Input Current Shaper Using CUK Converter" By Milivoje Brkovic and Slobodan Cuk of Power Electronics Group, California Institute of Technology; 1992 pp. 532–539.

Publication entitled "A Switching Power Supply of 99% Power Factory by the Dither Rectifier" by I. Takahashi and R.Y. Igarashi of Nagaoka University of Technology pp. 714–719.

INTEGRATED POWER CONVERTER AND METHOD OF OPERATION THEREOF

TECHNICAL FIELD OF THE INVENTION

The present invention is directed, in general, to power supplies and, more specifically, to an integrated power converter and a method of operation thereof.

BACKGROUND OF THE INVENTION

Developing highly-efficient power supplies, especially in combination with the ever-increasing constraints of high power density, is a continuing goal in power electronics. A switched-mode power converter or switched-mode converter is a frequently employed component of a power supply that converts an input voltage waveform into a specified output voltage waveform. There are several types of switched-mode converters including, for instance, an asymmetrical half-bridge power converter.

A conventional asymmetrical DC/DC half-bridge power converter ("half-bridge converter") includes two (2) power-switching transistors coupled to a control circuit, at least one input/output isolation transformer, a rectifier and a low-pass filter. The half-bridge converter generally operates as follows. The first and second power-switching transistors alternately conduct current in a complimentary manner to convert an input DC voltage into an AC voltage to be impressed across the isolation transformer. The rectifier, then, rectifies the voltage and the low-pass filter smooths and filters the rectified voltage for delivery to a load being supplied by the half-bridge converter.

The control circuit monitors the output voltage of the half-bridge converter and adjusts the duty cycle of the power-switching transistors to ultimately control the output voltage of the half-bridge converter. This degree of control provides a mechanism to maintain the output voltage at a relatively consistent level despite relative fluctuations in the input voltage and the load at the output.

In off-line power supply applications, a high power factor is frequently required. While a power factor of unity (i.e., 1.0) is the ultimate goal, a lesser power factor is in some cases considered acceptable in the related field. Therefore, in applications employing a DC/DC power converter or DC/DC converter (e.g., the half-bridge converter), a power factor correcting power converter on the front-end of the DC/DC converter may also be necessary to provide an acceptable power factor for the power supply.

A non-isolated boost power converter or boost converter, operating in a continuous conduction mode of operation or in a discontinuous conduction mode of operation with the appropriate control circuitry, may serve as the front-end power converter (i.e., front-end converter) to the half-bridge converter. A conventional boost converter includes an inductor and switching device coupled to an input voltage source of the boost converter. The switching device is then coupled to a diode and a capacitor. The load is connected in parallel to the capacitor. The control circuitry adjusts a duty cycle of the switching device to maintain the output voltage to the load within design parameters; the control circuity also controls the switching device and as a result achieves an instantaneous input current from an AC input in proportion to the instantaneous input voltage. The output voltage of the boost converter is always greater than the input voltage. When the switching device is on, the diode is reverse biased and the input voltage supplies energy to the inductor. When the switching device is off, the output stage receives energy from the inductor and the input voltage source. The boost power factor correcting converter, therefore, provides an acceptable power factor while providing a regulated voltage to the DC/DC converter coupled thereto.

While the front-end converters for power factor correction provide a viable solution in power supplies employing DC/DC converters (e.g., the half-bridge converter), the design may be improved for the following reasons. First, the power supply employs two separate power stages, with independent control, to satisfy power conversion to the load. As a result, the overall efficiency of the power supply is reduced because of the inherent inefficiencies associated with two separate and distinctly controlled converter stages in the power supply. Second, employing a boost converter, or other converter topologies, to serve as a power factor corrector adds additional complexity to the power supply. For instance, the boost converter includes a separate control circuit that takes up space and adds complexity to the front-end of the half-bridge converter. With the ever increasing goal of increasing the power density of the power supply, the separate front-end converter detracts from, rather than facilitates, the simplicity of the power supply.

Accordingly, what is needed in the art is an integrated power converter with power circuitry and controller that provides a well-regulated output with a sufficiently fast feedback loop for good transient response and, at the same time, provides a high power factor for a power supply employing the integrated power converter to advantage.

SUMMARY OF THE INVENTION

To address the above-discussed deficiencies of the prior art, the present invention provides an integrated power converter and a method of operation thereof.

The integrated power converter, having an energy storage device, includes: (1) a conditioning circuit coupled to the energy storage device and having a control switch for affecting a voltage across the energy storage device, (2) an asymmetrical half-bridge power circuit coupled to the energy storage device and having first and second power switches capable of being alternately activated to conduct current from the energy storage device to an output thereof and (3) a controller for controlling activation of both the control switch and the first and second power switches as a function of a characteristic of the output thereby to enhance a regulation of the output.

The present invention provides the advantages of two-stage power converters into an integrated power converter or integrated converter. More specifically, the integrated converter provides power factor correction (e.g., approaching unity power factor) at the input, while at the same time, maintaining a suitable voltage across the energy storage device (coupled between the conditioning circuit and the asymmetrical half-bridge power circuit or half-bridge power circuit) and a well-regulated output to a load coupled to the integrated converter. The integrated converter performs the above-referenced functions with simplicity by employing a single controller and by eliminating additional power mesh components and control circuitry replete in the prior art. The integrated converter produces additional benefits as hereinafter described. For instance, the conditioning circuit may provide protection against input inrush currents prevalent during start-up of a power supply (i.e., soft-start capability). Additionally, the integrated converter provides fast transient response and low output ripple due to a wide frequency band supportable by the controller feedback loop.

For the purposes of the present invention, the following terms are broadly defined as follows. A conditioning circuit generally refers to a circuit that conditions an input source for use by a subsequent circuit or system. For instance, the conditioning circuit of the present invention, without limitation, conditions the input source to, or provides, near unity power factor for the integrated converter. In conjunction therewith, the conditioning circuit affects a voltage across the energy storage device. The term, affects, should be construed in its broadest sense to include even indirect results therefrom. For instance, as described below, the control switch of the present invention facilitates the operation of the conditioning circuit to maintain an energy level of the energy storage device thereby varying the voltage, within a acceptable range, thereacross.

In an alternative embodiment of the present invention, the conditioning circuit includes an inductor capable of storing energy from an input source (e.g., an AC input source) during a first switching interval or first interval. The inductor is further capable of delivering energy to the energy storage device during a second switching interval or second interval. The inductor operates in a discontinuous conduction mode of operation to achieve power factor correction. In a related embodiment, the controller activates the control switch and the first power switch during the first interval for a duty cycle (D), the control switch providing a first conductive path between the input source and the inductor during the first interval. The controller further activates the second power switch during the second interval for a duty cycle (1-D), the control switch providing a second conductive path between the inductor and the energy storage device during the second interval.

The controller, therefore, monitors the output of the half-bridge power circuit and activates the switches in a complementary manner to suitably regulate the output voltage. The control switch and first power switch operate synchronously (i.e., in the same phase) to store energy in the inductor, while at the same time, delivering the previously stored energy from the energy storage device to the output of the integrated converter. In the alternate cycle, the second power switch conducts while the control switch and first power switch are non-conducting. During this interval, the energy from the inductor is transferred to the energy storage device. Again, as a result of the above-described operation, the voltage across the energy storage device is maintained within an acceptable range to optimize the operation of the integrated converter.

In an alternative embodiment of the present invention, the conditioning circuit includes a diode. The diode (e.g., a free-wheeling diode) assists in creating the second conductive path for the transfer energy from the inductor to the energy storage device during the second interval of operation. One of ordinary skill in the related art should be aware of the operation and advantages associated with diodes.

In an alternative embodiment of the present invention, the control switch and the first and second power switches are each field effect transistors ("FETs"). Switches, such as FETs, are employed in switched-mode power converters (as described herein) because of inherent characteristics of the power converters, such as zero-voltage switching, that augment the overall operation of the power conversion devices. One of ordinary skill in the pertinent art should understand that other switching devices are well within the scope of the present invention.

In an alternative embodiment of the present invention, the energy storage device includes a capacitive device. The capacitive device is charged and discharged in order to maintain the operation of the integrated converter. One of ordinary skill in the pertinent art should understand that other energy storage devices are well within the scope of the present invention.

In an alternative embodiment, the converter includes a delay circuit, coupled to the controller, for delaying activation of the control switch. The delay circuit, therefore, regulates the voltage across the energy storage device against variations in the load and fluctuations at the input of the integrated converter. The regulated voltage across the energy storage device allows further optimization of the half-bridge power circuit for enhanced performance while maintaining the overall simplicity of the integrated converter.

In another aspect of the present invention, the integrated converter is employed in a power supply. The power supply includes: (1) an input for receiving an input AC voltage, (2) an input low-pass filter, coupled to the input, for filtering the input AC voltage, (3) an input rectifier, coupled to the input low-pass filter, for rectifying the input AC voltage and (4) the integrated converter, constructed according to the principles of the present invention, for supplying a well-regulated output voltage to a load coupled thereto. In addition to the power switches, the half-bridge power circuit of the integrated converter generally includes an isolation transformer to provide galvanic primary to secondary isolation for the power supply. In a related embodiment, the half-bridge power circuit also includes an output rectifier and low-pass filter to provide a clean rectified voltage to the load being supplied by the power supply.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
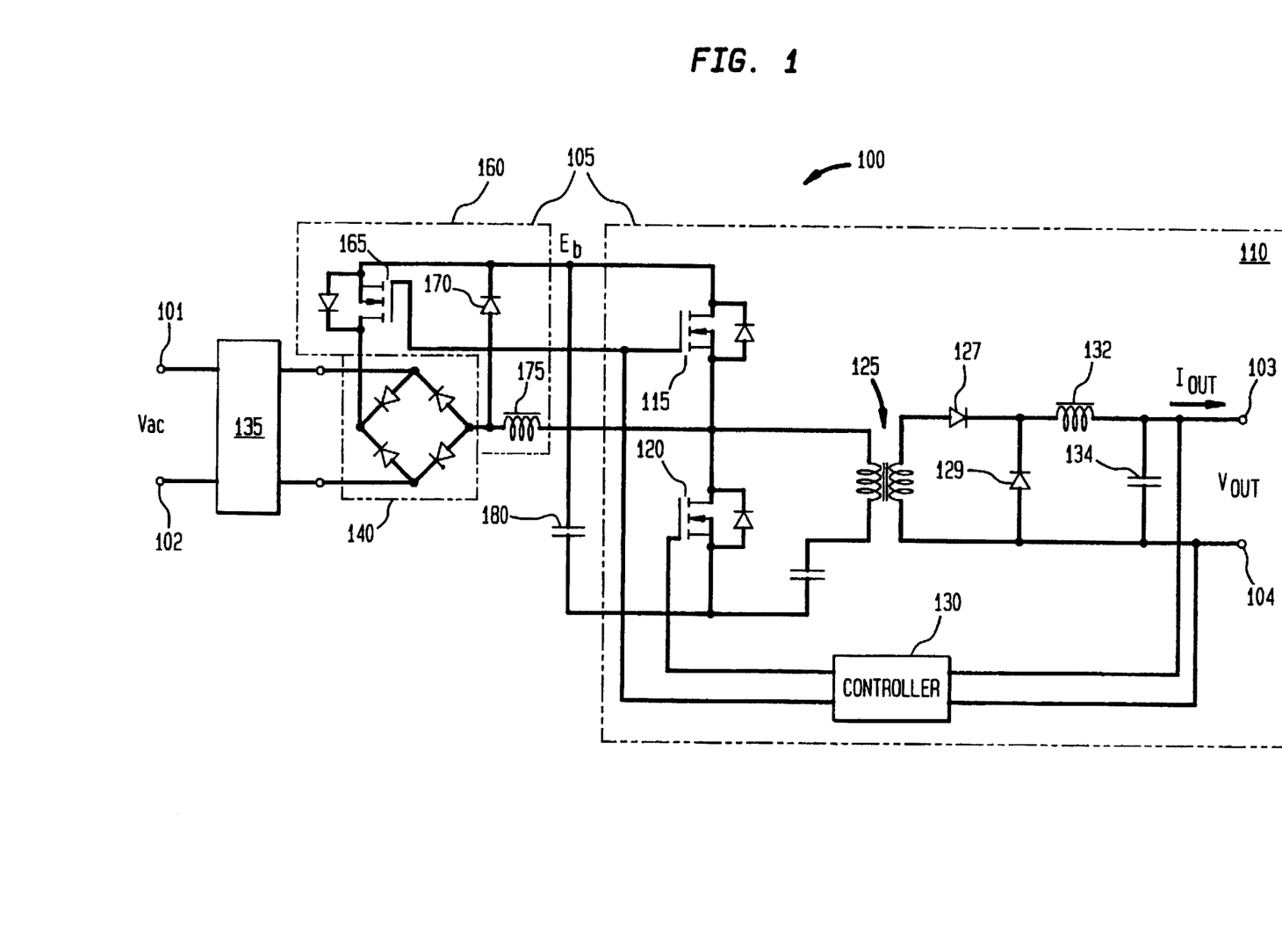
FIG. 1 illustrates a representative power supply incorporating an integrated power converter in accordance with the principles of the present invention.

Referring initially to FIG. 1, illustrated is representative power supply 100 incorporating an integrated power converter or integrated converter 105 in accordance with the principles of the present invention. The integrated converter 105 includes an asymmetrical half-bridge power circuit ("half-bridge power circuit") 110, a controller 130 (presented within the half-bridge power circuit 110 in the illustrated embodiment) and a conditioning circuit or buck cell 160. The half-bridge power circuit 110 includes power switches 115, 120, an isolation transformer 125, an output rectifier (e.g., diodes 127, 129 in the illustrated embodiment) and an output low-pass filter (e.g., inductor 132 and capacitor 134 in the illustrated embodiment). The power supply 100 further includes an input low-pass filter [e.g., an electromagnetic interference ("EMI") filter] 135, an input AC full-bridge rectifier or input rectifier 140 and bulk capacitor 180.

The buck cell 160 (including a power switch 165, freewheeling diode 170 and inductor 175) is coupled between the input rectifier 140 and bulk capacitor 180. The bulk capacitor 180, as hereinafter described, is charged by the operation of the integrated converter. More specifically, during a first switching interval or first interval the inductor 175 is charged with energy. During a second switching interval or second interval, the energy in the inductor 175 is transferred to the bulk capacitor 180.

The operation of the half-bridge power circuit 110 is generally known to those of ordinary skill in the art and, thus, a detailed description will not be provided. Typically, the half-bridge power circuit 110 is a voltage fed DC-to-DC power converter or DC/DC converter that is able to operate over a certain range of DC input voltages, $E_{b\,min}$ to $E_{b\,max}$. The input current of the half-bridge power circuit 110, averaged over a switching cycle, at a given load, is inversely related to the DC input bus voltage $E_b$ (e.g., for lower DC input voltages, the half-bridge power circuit 110 typically draws greater input currents). In the integrated converter 105 of the present invention, however, the instantaneous input AC current is proportional to the instantaneous input AC voltage thereby providing a high power factor. The input characteristic of the power supply 100 incorporating the integrated converter 105 emulates a resistor with respect to the AC utility line connected to input terminals 101, 102 (while also maintaining a well-regulated DC voltage at output terminals 103, 104) thereby realizing a power factor near unity.

In operation, the AC line voltage is coupled to the input rectifier 140 through the input terminals 101, 102 and input low-pass filter 135. The switching operation of the power switch 165 of the buck cell 160 and the power switches 115, 120 of the integrated converter 105 simultaneously controls two power conversion processes. The first power conversion process is the conversion of AC line voltage, rectified by the input rectifier 140, into a DC bus voltage developed across the bulk capacitor 180. The second power conversion process, accomplished by the half-bridge power circuit 110, is the conversion of the DC bus voltage across bulk capacitor 180 into isolated and well-regulated DC voltage at the output terminals 103, 104.

The power switches 115, 120 operate in a complementary manner with duty cycles of D and 1-D, respectively. In a preferred embodiment, the controller 130 is a pulse-width-modulator circuit operative (capable of producing two complimentary power trains D and 1-D) to monitor the DC voltage at the output terminals 103, 104 and adjust the duty cycle D as necessary to maintain precise regulation of the DC voltage. Pulse-width-modulator control circuits are well known to those of ordinary skill in the art. The power switch 165 of the buck cell 160 is also controlled by the controller 130 of the half-bridge power circuit 110 and is operated synchronously (i.e., in phase with) with the power switch 115.

The first power conversion process (i.e. the conversion of AC line voltage into a DC bus voltage developed across bulk capacitor 180) is accomplished, in part, during the part of the switching cycle when both the power switch 165 and the power switch 115 are driven on by the controller 130. When both the power switch 165 and the power switch 115 are on, the inductor 175 is charged with energy by a current flowing from the input terminals 101, 102, through the input low-pass filter 135, input rectifier 140 and the power switches 165, 115. In a complementary part of the cycle (i.e. when the power switches 165, 115 are off and the power switch 120 is on), the stored energy in the inductor 175 is delivered into the bulk capacitor 180 through the freewheeling diode 170 and the power switch 120.

The second power conversion process occurs simultaneously with the first part of the first power conversion process (i.e., during the period when the power switches 165 and 115 are on and the power switch 120 is off). When the power switch 115 is on, energy stored in the bulk capacitor 180 causes a current to flow through the primary winding of the transformer 125 of the half-bridge power circuit 110. The method employed by the half-bridge power circuit 110 to convert the energy stored in the bulk capacitor 180 into a DC voltage at the output terminals 103, 104 of the power supply 100 is generally known to those of ordinary skilled in the art and, therefore, will not be described.

Figure 2:
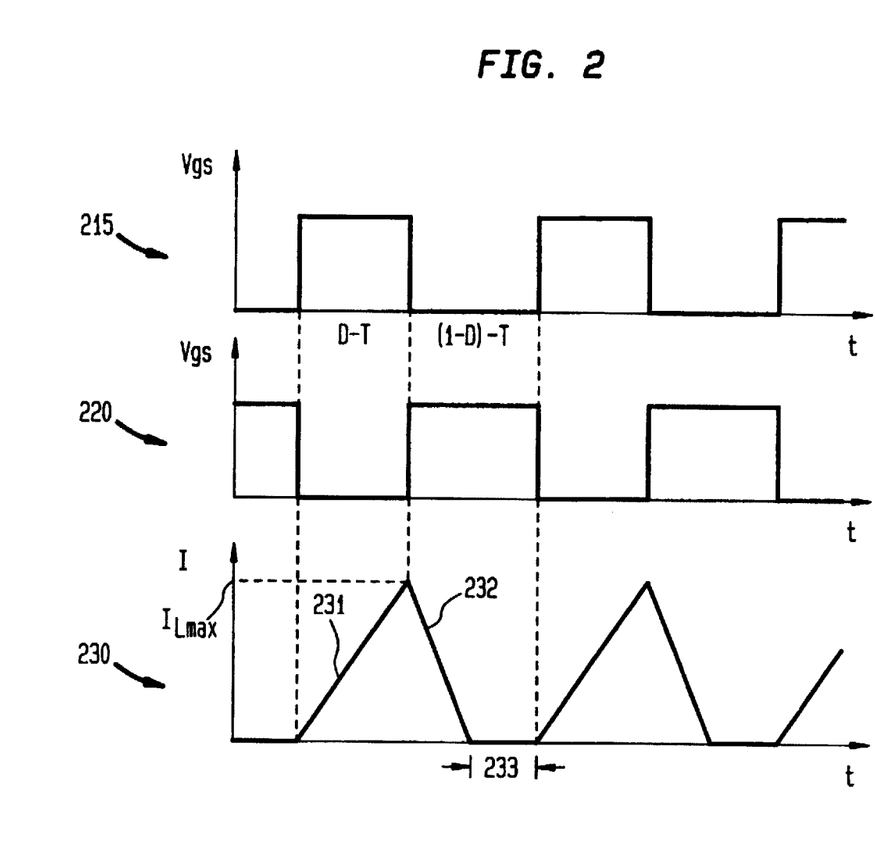
FIG. 2 illustrates timing diagrams of the power supply of FIG. 1.

Turning now to FIG. 2, illustrated are timing diagrams of the power supply 100 of FIG. 1. The following waveforms will be described with continuing reference to FIG. 1. More specifically, a pulse train 215 illustrates a control signal, generated by the controller 130, that is applied to the gates of the power switches 115 and 165. A pulse train 220 illustrates a control signal, generated by the controller 130, that is applied to the gate of the power switch 120. Finally, a waveform 230 illustrates a current through the inductor 175.

Those of ordinary skill in the art will recognize that the reference in the curves to the letter "T" represents a reciprocal of the switching frequency of the power supply 100; the reference to the letter "D", in the curves, represents a duty cycle of the power switches. As previously described and demonstrated by the pulse trains 215 and 220, the power switches 115, 120 operate in a complementary manner with duty cycles of D and 1-D, respectively; the power switch 165 of the buck cell 160 is operated synchronously (i.e., in phase with) with the power switch 115. Thus, when both the power switch 165 and the power switch 115 are on, the inductor 175 is charged by a current having a waveform illustrated by a region 231 of the waveform 230. In the complementary part of the cycle (i.e. when the power switches 165, 115 are off and the power switch 120 is on), the energy stored in the inductor 175 is delivered into the bulk capacitor 180 as illustrated by a region 232 of the waveform 230. The process of charging the inductor 175 and thereafter discharging the inductor 175 into the bulk capacitor 180 is repeated every switching cycle.

To achieve a power factor approaching unity at the input terminals 101, 102, the inductor 175 operates in a discontinuous conduction mode of operation. Therefore, those of skill in the art will recognize that the value of the inductor 175 should be chosen according to the formula:

$$L < \frac{E_b(1-D)}{F_o I_m} \quad (1)$$

where L is the value of the inductor 175, $F_o$ is the switching frequency of the power supply 100, and $I_m$ is the peak inductor current. The value of L should be selected to insure that, for a given range of input voltages and a load across the output terminals 103, 104, the current through the inductor 175 decreases to zero when the inductor 175 discharges all of its energy into the bulk capacitor 180. This "discontinuous conduction mode" of the inductor 175 is illustrated by the waveform 230, where it can be seen that the current of the inductor 175 has a value of zero in a region 233. Satisfaction of the above equation ensures that the current through the inductor 175 ceases flowing before the power switch 120 turns off.

A further preferable condition for the proper operation of the power supply 100 is that the voltage $E_b$ across the bulk capacitor (i.e., the voltage at the input voltage of the half-bridge power circuit 110) should be maintained between $E_{b\ min}$ and $E_{b\ max}$. As those of ordinary skill in the art will recognize, the voltage $E_b$ may be properly maintained by adhering to the following equations:

$$D_{min} = \frac{1}{V_{acmax}} \cdot \sqrt{(2 \cdot L \cdot V_{out} \cdot I_{out} \cdot F_o)} \quad (2)$$

$$D_{max} = \frac{1}{V_{acmin}} \cdot \sqrt{(2 \cdot L \cdot V_{out} \cdot I_{out} \cdot F_o)} \quad (3)$$

$$E_{bmin} = \frac{V_{out}}{W_{dc}(D_{max})} \quad (4)$$

$$E_{bmax} = \frac{V_{out}}{W_{dc}(D_{min})} \quad (5)$$

where:

$V_{ac\ min}$ and $V_{ac\ max}$ the preferred minimum and maximum RMS voltages provided at the input terminals 101, 102, $V_{out}$ and $I_{out}$ are the preferred output voltage and current available at the output terminals 103, 104, respectively, L is the value of the inductor 175, $F_o$ is the converter switching frequency, $D_{min}$ and $D_{max}$ are the minimum and maximum duty cycles within the preferred operating range, and $W_{dc}(D_{max})$ and $W_{dc}(D_{min})$ are regulating characteristics of the power conversion topology selected for use in the power supply 100.

Those of skill in the art will readily appreciate the utility of equations (2), (3), (4), and (5), in selecting the parameters of the power supply 100 to achieve a desired range of operation.

Figure 3A:
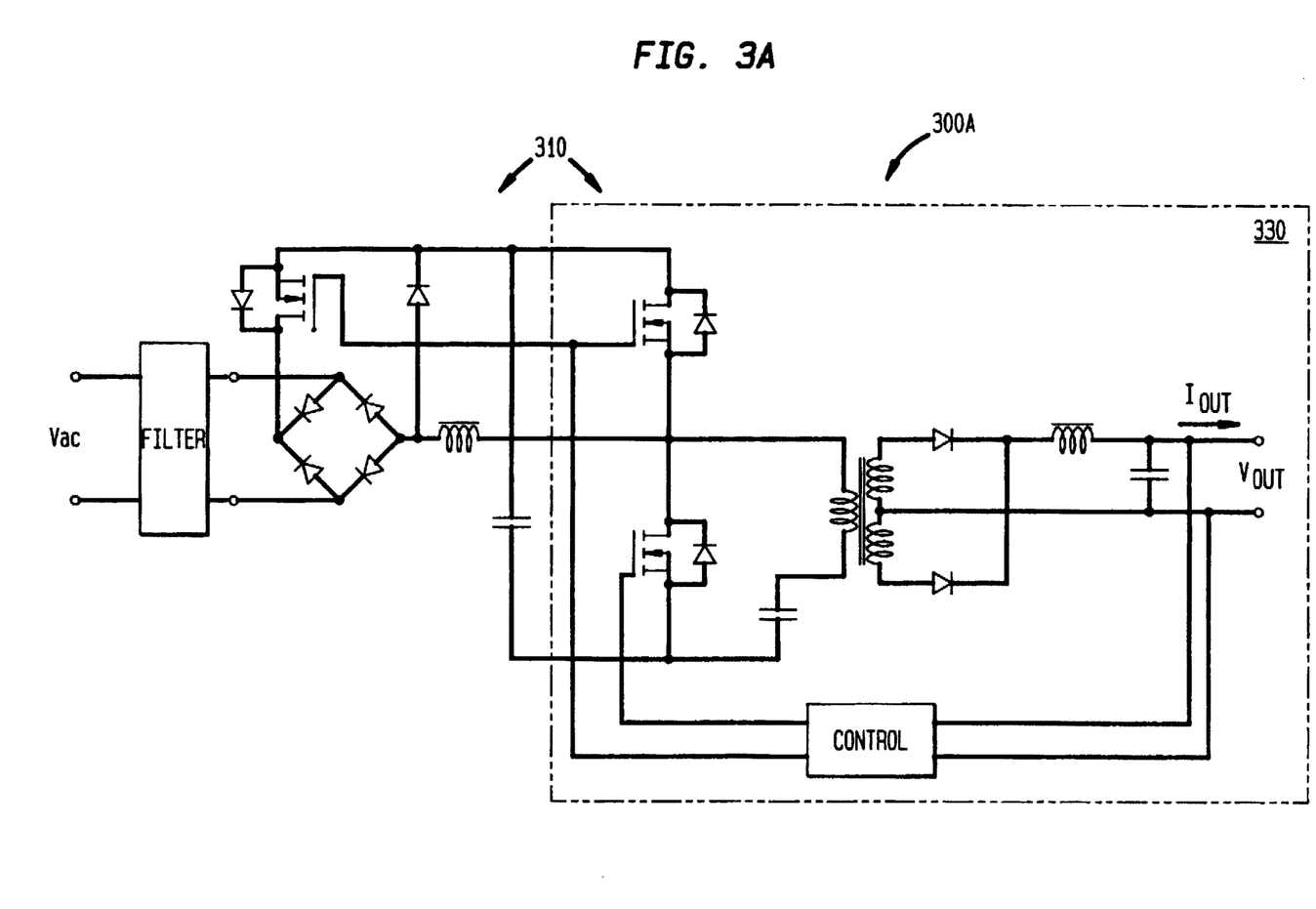
FIGS. 3A, 3B illustrate alternative embodiments of power supplies each incorporating an integrated power converter in accordance with the principles of the present invention.
Figure 3B:
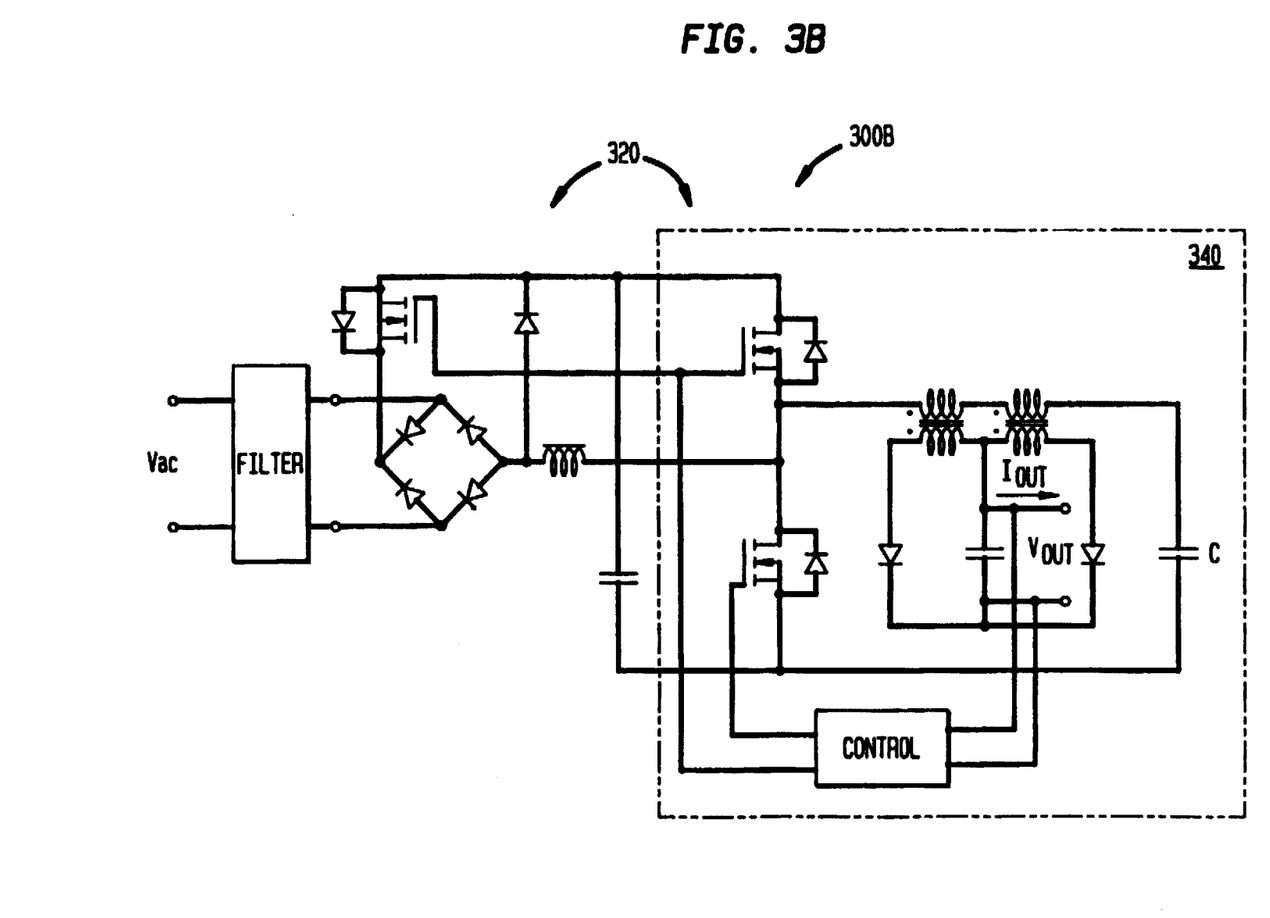

Turning now to FIGS. 3A and 3B, illustrated are alternative embodiments of power supplies 300A, 300B incorporating an integrated converter 310, 320, respectively, in accordance with the principles of the present invention. The power supplies 300A, 300B are analogous to the power supply 100 of FIG. 1, with the exception of the particular circuit topology for a half-bridge power circuit 330, 340 employed therein. Those of ordinary skill in the art should understand that the half-bridge power circuits 110, 330, 340 of FIGS. 1, 3A, 3B, respectively, operate in a similar manner and are each operative to be employed in accordance with the principles of the present invention.

For an analysis of the operation of analogous half-bridge power circuits in power converters, the readers attention is directed to: (1) U.S. Pat. No. 5,305,191 to Loftus, issued on Apr. 19, 1994, entitled "Drive Circuit for Zero-Voltage Switching Power Converter with Controlled Power Switch Turn-On," (2) U.S. Pat. No. 5,274,543 to Loftus, issued on Dec. 28, 1993, entitled "Zero-Voltage Switching Power Converter with Lossless Synchronous Rectifier Gate Drive" and (3) U.S. Pat. No. 5,268,830 to Loftus, issued on Dec. 7, 1993, entitled "Drive Circuit for Power Switches of a Zero-Voltage Switching Power Converter," all commonly assigned with the present invention and herein incorporated by reference. In conjunction therewith, the integrated converters 310, 320 operate analogously to the integrated converter 105 described with respect to FIG. 1.

Figure 4:
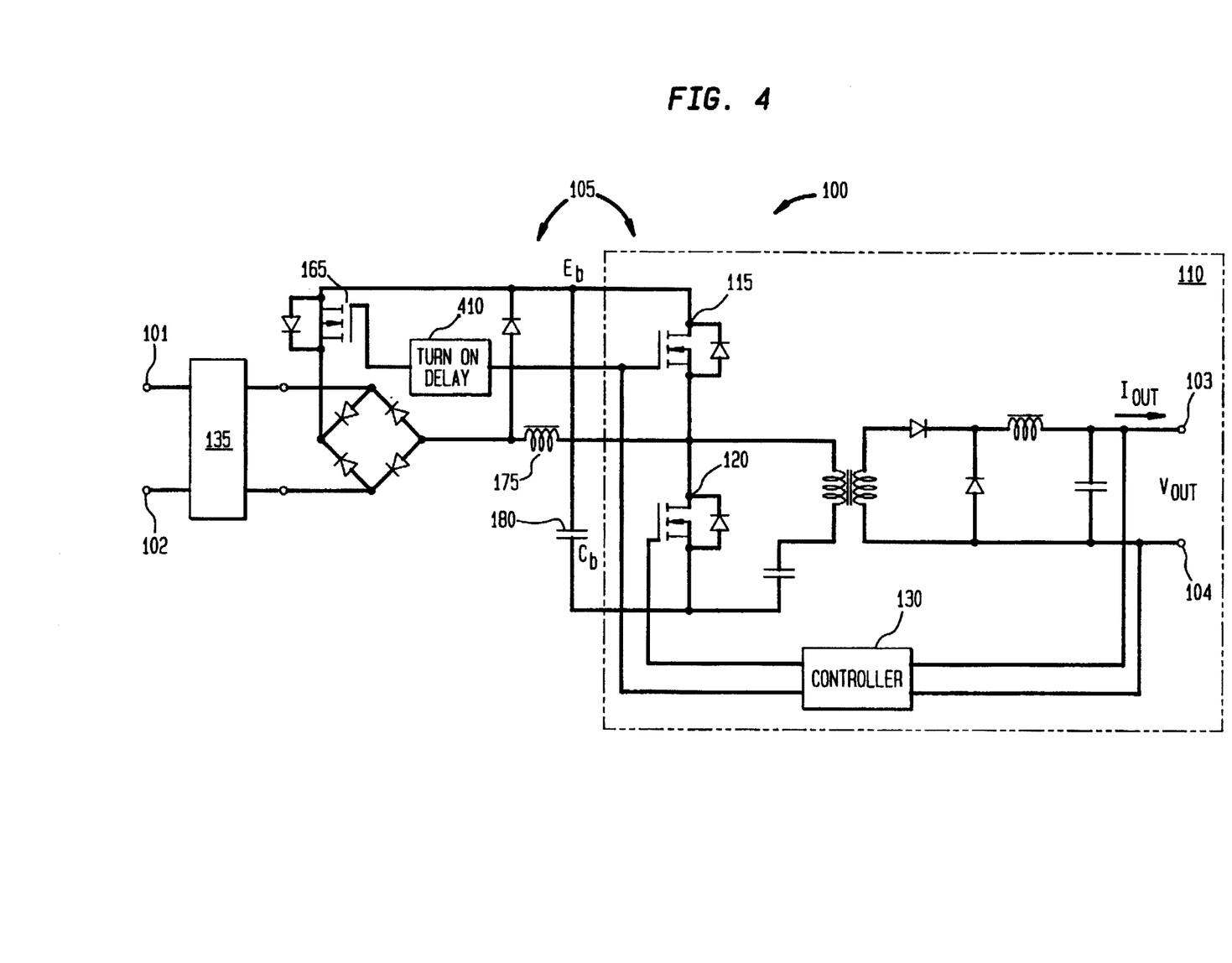
FIG. 4 illustrates the power supply of FIG. 1 incorporating a delay circuit according to the principles of the present invention.

Turning now to FIG. 4, illustrated is the power supply 100 of FIG. 1 incorporating a delay circuit 410 according to the principles of the present invention. The power supply 100 is further improved by introducing a controlled time delay between turning on the power switch 115 and turning on the power switch 165. The delay circuit 410 is equally applicable to the half-bridge power circuits 330, 340 presented with respect to FIGS. 3A, 3B. Additionally, the delay circuit 410 is also applicable in other power supply topologies including, without limitation, pulse width modulator forward converters, bridge converters and single-ended forward converters with an active clamp. While the delay circuit 410 will hereinafter be described, including a function and related advantages, with respect to the half-bridge power circuit 110, one of ordinary skill in the pertinent art should understand that the delay circuit 410 provides analogous benefits to the other power supply topologies employing the delay circuit 410 to advantage.

The purpose of introducing the delay circuit 410 is to provide enhanced regulation of the DC bus voltage $E_b$ (across the bulk capacitor 180). The capability of regulating the DC bus voltage $E_b$ against changes in the load connected to the output terminals 103, 104 and variations in the AC utility voltage coupled to the input terminals 101, 102 allows optimization of the half-bridge power circuit 110. The regulation is achieved by slowly modulating the amount of energy stored in the inductor 175 and thereafter delivered into the bulk capacitor 180. Through tight regulation of the DC bus voltage $E_b$, the design of the half-bridge power circuit 110 can be further optimized for greater efficiency, simplicity, and lower component costs (e.g., lower voltage rated switching devices).

Figure 5:
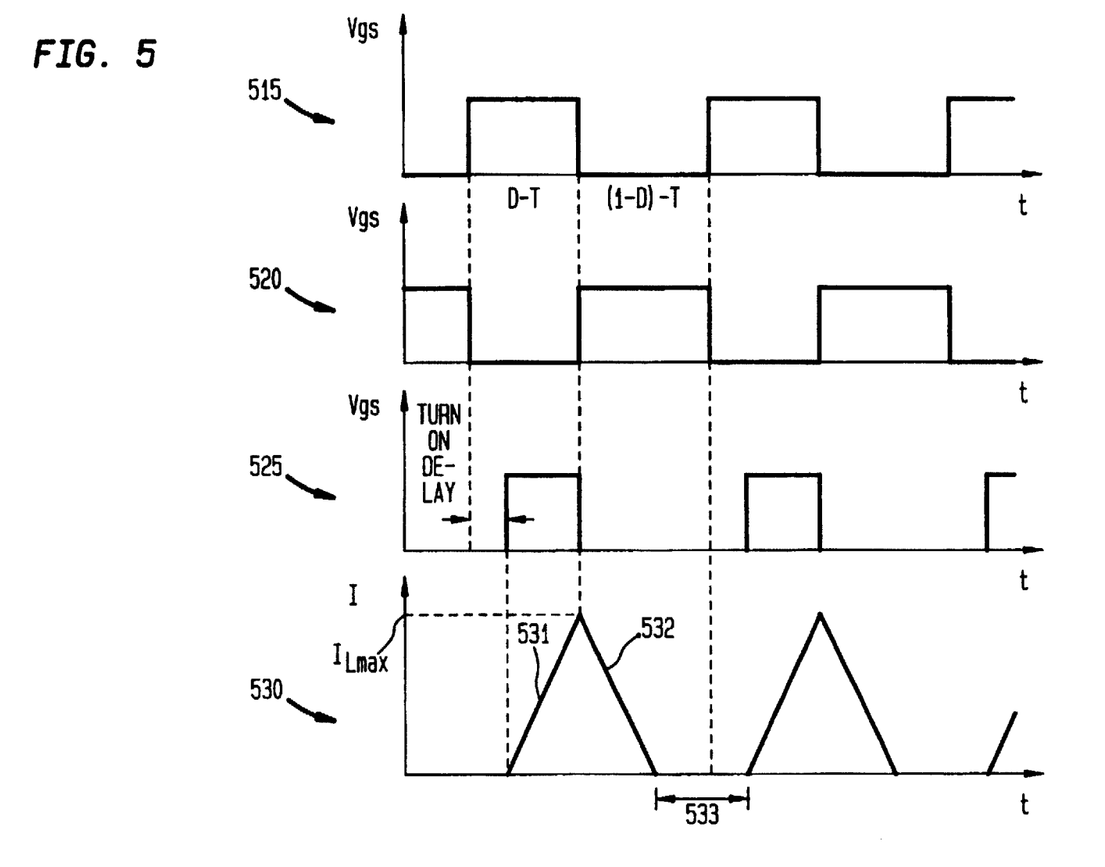
FIG. 5 illustrates timing diagrams of the power supply of FIG. 4.

Turning now to FIG. 5, illustrated are timing diagrams of the power supply 100 of FIG. 4. The following waveforms will be described with continuing reference to FIG. 4. More specifically, a pulse train 515 illustrates a control signal, generated by the controller 130, that is applied to the gate of the power switch 115. A pulse train 520 illustrates a control signal, generated by the controller 130, that is applied to the gate of the power switch 120. A pulse train 525 illustrates a control signal, generated by the controller 130, that is delayed by the delay circuit 410 and then applied to the gate of the power switch 165. Finally, a waveform 530 illustrates the resultant waveform for a current through the inductor 175.

Those of ordinary skill in the art will recognize that the reference in the waveforms to the letter "T" represents a reciprocal of the switching frequency of the power supply 100; the reference to the letter "D", in the waveforms, represents a duty cycle of the power switches. As previously described (see description with respect to FIG. 2) and now demonstrated by the pulse trains 515, 520, the power switches 115, 120 operate in a complementary manner with duty cycles of D and 1-D, respectively. In contrast to the operation of the power supply 100, however, the power switch 165 of the power supply 100 with the delay circuit 410 is not operated synchronously (i.e., in phase with) with the power switch 115. As demonstrated in the pulse train 525 of FIG. 5, the turn-on time for the power switch 165 is delayed from the turn-on time for the power switch 115. Thus, the duty cycle of the power switch 165, and thereby the charging time for the inductor 175, is decreased.

When both the power switch 165 and the power switch 115 are on, the inductor 175 is charged by a current having a waveform illustrated by a region 531 of the waveform 530. In the complementary part of the cycle (i.e., when the power switches 165, 115 are off and the power switch 120 is on), the energy stored in the inductor 175 is delivered into the bulk capacitor 180 as illustrated by a region 532 of the waveform 530. The process of charging the inductor 175 and thereafter discharging the inductor 175 into the bulk capacitor 180 is repeated every switching cycle.

Figure 6:
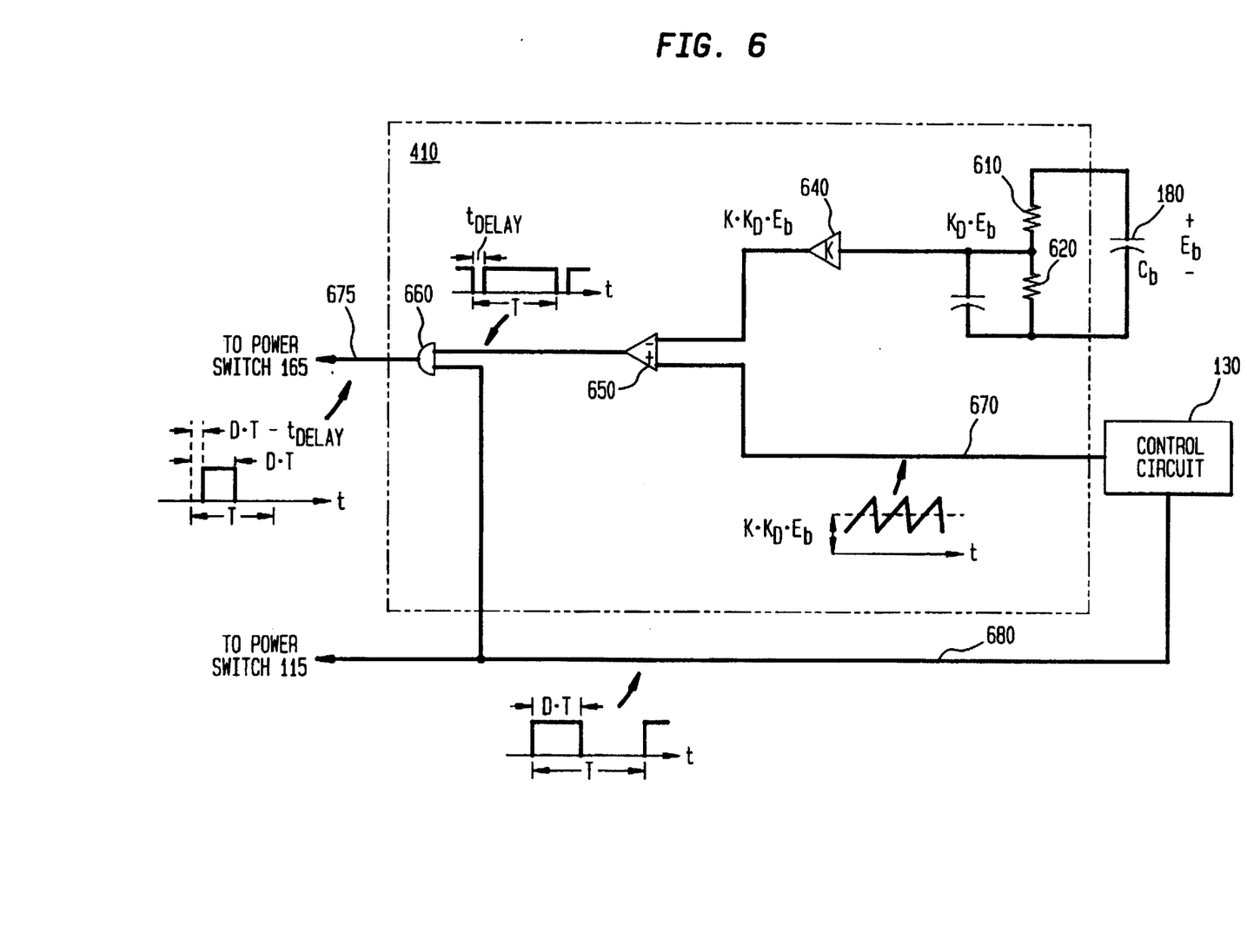
FIG. 6 illustrates one embodiment of the delay circuit of FIG. 4 according to the principles of the present invention.

Turning now to FIG. 6, illustrated is one embodiment of the delay circuit 410 of FIG. 4 according to the principles of the present invention. A delay circuit generally operates as follows. The delay circuit 410, coupled to the bulk capacitor 180, generally monitors the DC bus voltage $E_b$. The voltage $E_b$ across the bulk capacitor 180 is scaled by a voltage divider including a pair of resistors 610, 620. The voltage divider ratio across the resistors 610, 620 has a value of $K_D$. The scaled value of $E_b$ is then amplified by an amplifier 640, having a gain of K, yielding a voltage at the output of the amplifier 640 substantially equal to $K \cdot K_D \cdot E_b$.

The delay circuit 410 is also coupled to a control signal line 670 on which a sawtooth signal associated with the controller 130 is present. This signal is compared by the comparator 650 with the signal at the output of the amplifier 640. The output signal thereby generated by the comparator 650 is a pulse train having a duration of T minus some value substantially equal to a desired time delay, $t_{delay}$.

The delay circuit 410 is further coupled to a control signal line 680 on which the controller 130 generates an appropriate drive signal for the power switch 115. This drive signal consists of a pulse train having a duration substantially equal to D·T. A logic gate 660 of the delay circuit 410 compares the drive signal for the power switch 115 on the control signal line 680 with the output signal generated by the comparator 650 to produce a drive signal for the power switch 165 on the control signal line 675. The drive signal for the power switch 165 has a duration substantially equal to D·T minus $t_{delay}$. Thus, as previously described, the delayed turn-on of the power switch 165 will decrease the charging of the inductor 175. By decreasing the charging of the inductor 175, less energy is subsequently transferred to the bulk capacitor 180, thereby regulating the DC bus voltage $E_b$ as a function of the time delay, $t_{delay}$, generated by the delay circuit 410.

Those of ordinary skill in the art will recognize that the delay circuit 410 is equally applicable to other asymmetrical half-bridge power conversion circuits (e.g., the half-bridge power circuits 330, 340 illustrated in the power supplies 300A, 300B of FIGS. 3A, 3B, respectively). Moreover, the delay circuit 410 is presented for illustrative purposes only and other delay circuit topologies are well within the scope of the present invention.

Although the present invention has been described in detail, those skilled in the art should understand that they can make various changes, substitutions and alterations herein without departing from the spirit and scope of the invention in its broadest form.

What is claimed is:

1. An integrated power converter having an energy storage device, comprising:

a conditioning circuit coupled to said energy storage device and having a control switch for affecting a voltage across said energy storage device;

an asymmetrical half-bridge power circuit coupled to said energy storage device and having first and second power switches capable of being alternately activated to conduct current from said energy storage device to an output thereof; and a controller for controlling activation of both said control switch and said first and second power switches as a function of a characteristic of said output thereby to enhance a regulation of said output.

2. The converter as recited in claim 1 further comprising a delay circuit, coupled to said controller, for delaying activation of said control switch.

3. The converter as recited in claim 1 wherein said conditioning circuit further comprises an inductor capable of storing energy from an input source during a first interval, said inductor further capable of delivering energy to said energy storage device during a second interval.

4. The converter as recited in claim 3 wherein said controller activates said control switch and said first power switch during said first interval for a duty cycle (D), said control switch providing a first conductive path between said input source and said inductor during said first interval, said controller further activating said second power switch during said second interval for a duty cycle (1-D), said control switch providing a second conductive path between said inductor and said energy storage device during said second interval.

5. The converter as recited in claim 1 wherein said conditioning circuit comprises a diode.

6. The converter as recited in claim 1 wherein said control switch and said first and second power switches are each field effect transistors (FETs).

7. The converter as recited in claim 1 wherein said energy storage device comprises a capacitive device.

8. A method of operating an integrated power converter having an energy storage device, comprising the steps of:

affecting a voltage across said energy storage device with a control switch of a conditioning circuit;

alternately activating first and second power switches of an asymmetrical half-bridge power circuit, said first and second power switches conducting current from said energy storage device to an output thereof; and controlling activation of both said control switch and said first and second power switches with a controller, said control being a function of a characteristic of said output thereby to enhance a regulation of said output.

9. The method as recited in claim 8 further comprising the step of delaying an activation of said control switch with a delay circuit coupled to said controller.

10. The method as recited in claim 8 wherein the step of affecting further comprises the steps of:

storing energy in an inductor of said conditioning circuit received from an input source during a first interval; and delivering energy from said inductor to said energy storage device during a second interval.

11. The method as recited in claim 10 wherein the step of controlling further comprises the steps of:

activating said control switch and said first power switch, with said controller, during said first interval for a duty cycle (D), said control switch providing a first conductive path between said input source and said inductor during said first interval; and activating said second power switch, with said controller, during said second interval for a duty cycle (1-D), said control switch providing a second conductive path between said inductor and said energy storage device during said second interval.

12. The method as recited in claim 8 wherein said conditioning circuit comprises a diode.

13. The method as recited in claim 8 wherein said control switch and said first and second power switches are each field effect transistors (FETs).

14. The method as recited in claim 8 wherein said energy storage device comprises a capacitive device.

15. A power supply, comprising:

an input for receiving an input AC voltage;

an input low-pass filter, coupled to said input, for filtering said input AC voltage;

a input rectifier, coupled to said input low-pass filter, for rectifying said input AC voltage; and an integrated power converter having an energy storage device, comprising:
 a conditioning circuit coupled to said energy storage device and having a control switch for affecting a voltage across said energy storage device,
 an asymmetrical half-bridge power circuit coupled to said energy storage device and having first and second power switches capable of being alternately activated to conduct current from said energy storage device to an output thereof, and
 a controller for controlling activation of both said control switch and said first and second power switches as a function of a characteristic of said output thereby to enhance a regulation of said output.

16. The power supply as recited in claim 15 further comprising a delay circuit, coupled to said controller, for delaying an activation of said control switch.

17. The power supply as recited in claim 15 wherein said conditioning circuit further comprises an inductor capable of storing energy from said rectified input AC voltage during a first interval, said inductor further capable of delivering energy to said energy storage device during a second interval.

18. The power supply as recited in claim 17 wherein said controller activates said control switch and said first power switch during said first interval for a duty cycle (D), said control switch providing a first conductive path between said input and said inductor during said first interval, said controller further activating said second power switch during said second interval for a duty cycle (1-D), said control switch providing a second conductive path between said inductor and said energy storage device during said second interval.

19. The power supply as recited in claim 15 wherein said conditioning circuit comprises a diode.

20. The power supply as recited in claim 15 wherein said asymmetrical half-bridge power circuit comprises an isolation transformer.

21. The power supply as recited in claim 15 wherein said asymmetrical half-bridge power circuit comprises an output rectifier and an output low-pass filter.

* * * * *